United States Patent [19]

Palmer

[11] Patent Number: 4,541,984
[45] Date of Patent: Sep. 17, 1985

[54] GETTER-LUBRICANT COATING FOR NUCLEAR FUEL ELEMENTS

[75] Inventor: David N. Palmer, Tolland, Conn.

[73] Assignee: Combustion Engineering, Inc., Windsor, Conn.

[21] Appl. No.: 427,242

[22] Filed: Sep. 29, 1982

[51] Int. Cl.$^4$ ............................................. G21C 3/06
[52] U.S. Cl. .................................. 376/415; 376/417; 252/11
[58] Field of Search ................... 376/415–418, 376/339, 424, 902; 252/11, 181.6, 1, 478

[56] References Cited

U.S. PATENT DOCUMENTS

| 3,231,521 | 1/1966 | Sturges et al. | 376/339 X |
| 3,350,274 | 10/1967 | Higatsberger | 376/418 |
| 3,423,375 | 1/1969 | Strand | 376/339 X |
| 3,919,298 | 11/1975 | Scott et al. | 376/339 X |
| 3,925,151 | 12/1975 | Klepfer | 376/415 |
| 3,954,559 | 5/1976 | Oguma et al. | 376/418 |
| 4,052,539 | 10/1977 | Shropshire et al. | 429/194 |
| 4,200,460 | 4/1980 | Grossman et al. | 376/418 X |
| 4,252,691 | 2/1981 | Lipp et al. | 252/478 |
| 4,282,074 | 8/1981 | Du Bois | 376/339 X |
| 4,316,771 | 2/1982 | Lee | 376/415 |

FOREIGN PATENT DOCUMENTS 2439456 6/1980 France ............................... 376/339

Primary Examiner—Richard E. Schafer
Assistant Examiner—Daniel Wasil
Attorney, Agent, or Firm—Richard H. Berneike

[57] ABSTRACT

A getter-lubricant coating system between the nuclear fuel and the fuel cladding minimizes the pellet-clad stress concentration and renders fission gases and impurities unreactive to the cladding. The getters are matched to the lubricant matrix such that they are homogeneously dispersed in the matrix and are physically and/or chemically bound in place. A preferred form of the getter is a graphite or boron nitride intercalate of the getter material.

7 Claims, No Drawings

GETTER-LUBRICANT COATING FOR NUCLEAR FUEL ELEMENTS

BACKGROUND OF THE INVENTION

One of the problems which can occur in nuclear reactors is a failure of the fuel cladding during in-core service. Based upon all of the data which is currently available, a mechanism has been postulated which defines clad failures with service.

As a result of fuel burn-up, the fuel pellets swell at the ends to form hourglass configurations such that the ends of the pellets expand through the heat transfer gap between the pellet and the cladding and interact with the cladding. This pellet interaction with the cladding causes stress concentrations. Simultaneous with pellet swelling and pellet clad interaction, fission by-products such as iodine, cesium, rubidium and tellurium as well as trace levels of pellet impurities such as water or hydrocarbons (which ultimately decompose to hydrogen) outgas from the pellet. During the outgasing process, pellet interactions with the cladding increase the density of stress concentrations and biaxial stresses at the clad interfaces. Because of the increased stresses, the oxide film at the pellet/clad interface will sheer and rupture. Fission gas by-products and pellet impurities will migrate from the pellet through the helium or other heat transfer media and be absorbed at the areas of oxide rupture. These fission gas by-products and pellet impurities will accelerate the stress corrosion cracking of the clad and may cause clad failure.

Assuming that these mechanisms explain the failure of the fuel element cladding, two salient factors control the clad in-core reliability. These are the pellet/clad mechanical interaction and the by-product/impurity corrosive attack on cladding. Both of these operative factors must be controlled to eliminate clad failure. Mechanical interaction can be eliminated by introducing lubrication to the inside diameter of the clad or the outside diameter of the pellets or to both surfaces. This will prevent stress buildup. By-product/impurity corrosive attack can be eliminated by rendering the by-product/impurities unreactive. This can be accomplished by introducing getters into the region where stress concentrations are liable to be located. Gettering materials will combine with the gaseous, vaporous, or liquid materials and prevent them from reacting with the cladding.

Conventional gettering systems are normally located at the plenum region between fuel pellets in the active fuel stack, or in-fuel getters (mixed with the fuel). Capsuled getters are quite inefficient since the fusion gas must travel to the region where the capsule is located to be isolated. This could be a problem because the reactive gas can migrate past a stress concentrated area or a defect in the rod I.D. surface and actually enter into a reaction at that site. Thus the getter capsule acts as a fission product pump, pumping corrosion or reactive products past defects which could lead to more failures along the rod then would have been possible if the getter capsule was not placed in the rod. Also, isolated getter capsules (i.e., conventional getters) are ineffective against liquid phase products that fuse with clad protective oxides or thermochemically-mechanically induced solid-solid reactions which may occur at rod-pellet interfaces.

The use of getters located at pellet-pellet interfaces are an improvement over isolated getter capsules. However, there are serious drawbacks to fuel stack getters. Firstly, the use of pellet stack getters (e.g., disks at pellet interfaces) reduces the amount of active fuel in the fuel rod reducing the power of the rod. Additionally, the location of getter disks may change the heat transfer at the pellet interfaces. If a ceramic getter is used the pellet interfaces will not allow the hotter section of the fuel pellet to give off its excess heat which can yield hot spots or spiking of fission products. If a conductive getter disk is used the probability of fusion products or gas to migrate to pellet interfaces (where the interfaces are more susceptible to mechanical interaction with clad) is greatly enhanced. This could lead to swelling at pellet to pellet end-faces and could lead to higher pellet gassing (where some gases can transmutate to corrosive elements.

It should be noted that some considerations have to be made concerning the energitic state of the fission gases/impurities in relation to their ability to react with gettering material. The reaction of the fission gas/impurities with solid gettering particles can be classified as an heterogeneous reaction system where the residence time of the gas at the particle site interface controls the overall effectiveness and yield of the reaction of the gas or other fusion product or systems located at specific locations in a rod with the gettering material. If the velocity of the gas molecule is too rapid in the vicinity of the gettering system of this type, the gas will not chemisorb to the getter surface and sufficient periods will not be available which are essential for gettering efficiency. Introduction of gettering agents into the fuel matrixes suffers from the potential of being either inefficient because of the non-steady-state dynamics that occur in a fissioning fuel pellet or ineffective because of the release of fission products after having been gettered by thermal-radiolytic decomposition. This is caused by the generation of large recoil energies during the fissioning process in the fuel matrix which could cause gettered impurities to be released and thus available to migrate to the fuel-clad interface. Also, if a getter is combined with the fuel, it can decrease the power efficiency of the fuel system. Additionally, the structural changes that occur in the fuel pellets are dynamic and varied. Free surfaces may generate by fuel cracking allowing fission products to spike past in-fuel getters and migrate to pellet-clad interfaces. It should also be noted that the introduction of a getter into the fuel pellet may also further reduce the heat transfer characteristics of the pellet causing the fuel to operate at higher temperatures which may lead to increased fission product release.

SUMMARY OF THE INVENTION

The present invention involves the introduction of a coating between the fuel pellets and the fuel cladding in a nuclear fuel element consisting of active gettering agents dispersed homogeneously in a lubricant matrix. The gettering agents are physically and chemically matched to the lubricant system. Therefore, mechanical lubrication is provided to eliminate or minimize the pellet-clad stress concentration and getters are provided to render fission gases and impurities unreactive to the clad and to minimize the velocity and and surface area phenomena that could reduce the efficiency of the gettering process during in-core service.

DESCRIPTION OF THE PREFERRED EMBODIMENTS

Gettering Components

The gettering materials of the present invention are designed to chemically render fission products and/or pellet impurities unreactive to the cladding material. Fission products that are known to attack cladding materials, such as Zircaloy are alkalis including cesium and rubidium, fission product reaction products such as cesium uranates, cesium zirconates, cesium halides, halogens including iodine and group VI elements of the periodic table including tellurium. Pellet impurities that are known to attack Zircaloy clad are those materials containing hydrogen, such as hydrogen gas, water and hydrocarbons.

The gettering material proposed by this invention may be mixtures, blends or composites of materials that will react irreversibly with fission product/impurities at reactor temperatures and at radiation conditions. These materials are specifically adapted to be compatible with the coating system and the required handling methods. Gettering materials are classified into four categories, i.e., getters for hydrogen or hydrogen-containing materials, getters for halogens, getters for alkalis and getters fro group VI materials or compounds or mixtures of the four categories.

Getters For Hydrogen Or Hydrogen-Bearing Materials

The specific getters for hydrogen or hydrogen-bearing materials are those metals, metal alloys, intermetallic compounds, oxides, carbides, nitrides, or mixed oxide systems that will react with $H_2O$, $H_2$, unstable hydrides (including silanes), or hydrocarbons to form stable, thermodynamically irreversible hydrides or hydride compounds at reactor temperature and irradiation and conditions. The function of the gettering agent must not be significantly inhibited by the presence of the other gaseous species that may compete with the hydrogen or hydrogen-bearing materials for the active gettering surface cites at fission temperatures. For example, if a metal or metal alloy is employed as a gettering system in the presence of both oxygen and hydrogen, the oxygen should not form an overly protective oxide film to prevent hydrogen reaction.

Specifically, the getters for the hydrogen or hydrogen-bearing materials may be the powdered pure metals of zirconium, titanium or yttrium as well as various combinations, compounds, and alloys thereof including metal intercalates of graphite or boron nitride. For example, this getter may comprise alloys of these three metals together with each other or with aluminum, nickel, chromium or the carbides of nickel and chromium. The specific form of the getter and the manner in which the getter is prepared and incorporated into the lubricating matrix will be discussed hereinafter.

Getters for Halogens

The specific getters for the halogens are defined as those metals, metal alloys, intermetallic compounds, oxides, carbides, nitrides, mixed oxides, silicateous materials that will form intercalates of graphite or boron nitride that will react with halogens, hydrogen halides, organic halides or other halogenated species that may out gas from fuel pellets during nuclear in-core service as fission products and/or pellet impurities. These getters must be capable of forming thermodynamically irreversable or stable halides at reactor temperatures and radiation conditions. The halogen getter must not be significantly inhibited by the presence of other gaseous species that may compete with the halogen bearing material for the active gettering sites at fission temperatures. Examples of such gettering types are cerium, chromium, cobalt and nickel metal powders or their intercalates of graphite or boron nitride metals and there oxides, silicates, oxy silicates, silicides and carbides (including silicon carbide) as well as zirconium nitride. The specific form of the getter and the manner in which it is prepared and incorporated into the lubricating matrix will be discussed hereinafter.

Getters for Alkali Species

Alkali specific gettering materials are defined as those compounds that will react with certain fission by-products such as casium, rubidium, or similar alkalai species that can migrate from nuclear fuel and interact with fuel clad. Examples of alkali specific gettering materials that can be employed are mixed oxides, intermetallic compounds and metalloxysilicates. Again, the specific form of these getters and the manner in which they are prepared and incorporated into the lubricating matrix will be discussed hereinafter.

Group VI Getters

Certain Group VI atoms of the periodic table are known to be fission products of uranium oxide fuel. For example, tellurium can out gas from fuel during in-core service and could potentially interact with fuel clad and assist in fuel clad failure. Tellurium chemistry is very similar to sulfur chemistry, but tellurium is a stronger reducing agent than sulfur and obviously a weaker oxidizing agent. Tellurium can react to form stable tellurides with various materials such as silicates, silicides, nickel phosphide; and specific intercalates of graphite or boron nitride and other similar materials.

Composite or Combination Getter

From a practical viewpoint, the gettering system which is used will normally have the capability of removing all potential corrosive fission by-products as well as pellet impurities. Such a composite gettering system will be capable of irreversibly reacting with these by-products and impurities simultaneously. They include mixtures or composites such as Cr; and $CrO_3$—intercalates of graphite as a gettering lubricant the Cr-graphite intercalate will react with the fission product $I_2$ and the $CrO_3$-graphite intercalate will react with the fusion product cesium (forming a cesium chromate) or a fusion product—fuel byproduct such as cesium uranate(s) form cesium chromate. All the above reactions will occur interlamellarly and remain irreversibly combined in the graphite matrix.

Preparation of Gettering Agents

The getter-lubricant system of the present invention requires specifically modified or prepared gettering materials. It is obvious that the getters must be purified to nuclear purity criteria before addition into the lubricant matrix. However, the getters must also be modified in some fashion for compatability in the coating system to minimize the affects on the coating lubricant efficiency, to eliminate handling problems, to render the system compatible with lubricant cure cycles, and to maintain a reasonable degree of lubricant emoltion stability.

The getter materials, without classification as to their chemical specificity, which has been previously discussed in general, are separated into three groups as follows: (1) intercalated graphite systems; (2) intercalated boron nitride systems; and (3) pretreated or modified powder metal systems.

Intercalated graphitic systems may be defined as those systems containing metal atoms or mixtures of metal atoms interlamellarly or interstially chemically bound to non-turbostratic or highly ordered pyrollytic grade graphite.

For the purpose of classification, eight general types of intercalate synthesis are defined as follows: (1) formation of the metal ionic intercalated form by salt intercalation followed by reduction or dehalogenation to the metal atom intercalated form in a CO gas reduction system; (2) formation of the metal ionic intercalated form by salt intercalation followed by reduction or dehalogenation to the metal atom intercalated form in a $H_2$ gas reduction system; (3) reduction or dehalogenation from the metal ionic intercalated form to the metal atom intercalated form by organic reducing materials or by organic dehalogenation materials; (4) reduction or dehalogenation from the metal ionic intercalated form to the metal atom intercalated form by inorganic reducing or dehalogenation materials; (5) thermal treatment; (6) formation by metal vapor reaction with graphite species by vacuum sputtering ion sputtering, ion-implantation or similar high temperature inert gas metal vapor treatments; (7) formation by direct techniques such as the thermal decomposition of an ionic salt or non-metallic compound (intermetallic compound) at sufficiently high enough temperatures to cause the metal to vapor migrate interlamellarly into the graphite in an inert environment; (8) formation by the intercalation of organometallic materials soluble in the intercalation media that can be reduced or decomposed to the elemental intercalated state by suitable reduction methods. For the intercalated graphitic type gettering agents used in the present invention, the starting materials are selected from metal nitrates, oxalates, carbonyls, carbonates, nitrides, carbides, silicides, silanes, and silicates. If halogen starting materials (excluding fourides) can be removed to the 50 ppm by weight level, they may also be used. Ammoniated or aminated alkali metal and alkaline earth materials may be used if purity levels can be maintained. Type 1 synthesis of graphitic intercalates is accomplished by salt intercalation, reduction of the intercalated salt to the elemental state with CO gas, hydrolysis to remove the reduction by-products and drying as shown in the following sample reactions wherein the elemental symbol for carbon is used to represent graphite.

TYPE 1 SYNTHESIS

1. 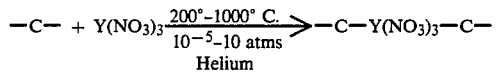

2. 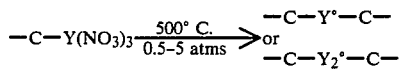

TYPE 1 SYNTHESIS
-continued

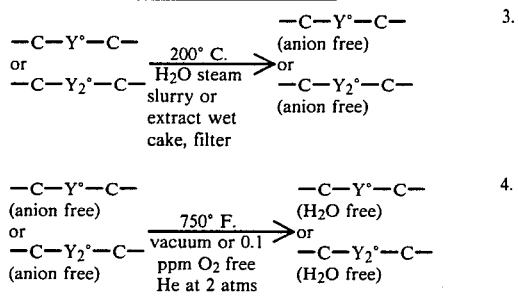

This type of synthesis which includes reduction with CO gas is used particularly with those metal or metal mixture intercalates that will form hydrides if reduced or dehalogenated with hydrogen or ammonia. Yttrium has been used in the example but other metals that could be used in this type of synthesis include cerium, zirconium, and titanium. Also the salt that has been used in this example is the nitrate but the same reactions could be carried out with the oxalate, the carbonate organometallic species. The graphite that is used is a concentrated colloidal dispersion of pure electric-furnace graphite or highly ordered pyrollytic grade graphite in a carrier such as isopropanol with an organic (polymeric) or inorganic binder.

Type 2 intercalation involves reduction with gaseous hydrogen or anhydrous ammonia from the ionic salt intercalated state to the metallic elemental state. The metals which can be used for Type 2 intercalation are those that are not susceptible to hydriding and include nickel, chromium, titanium, yttrium, and cobalt. The same salts of these metals that are indicated above as being suitable for Type 1 intercalation may be used for Type 2 intercalation. The type 2 synthesis is essentially the same as Type 1 synthesis except that the reduction step is carried out with hydrogen or anhydrous ammonia at one to ten atmospheres rather than with carbon monoxide.

Type 3 intercalation involves reduction to the elemental metallic or active gettering state after salt intercalation by the action of organic reducing materials or by reaction with organic dehalogenation or dehydrohalogenation systems. The same intercalation salts previously mentioned may be considered as salt precursors for Type 3 intercalation. Type 3 intercalation can be carried out with yttrium, cerium nickel, chromium, chromous oxide, chromium dioxide and chromic oxide. Table 1 is a list of the organic reducing, dehalogenation or dehydrohalogenation materials that can be used:

TABLE I

ORGANIC REDUCING, DEHALOGENATION, OR DEHYDROGALOGENATION MATERIALS

| | |
|---|---|
| diphenyl lithium | sodium cyclohexanebutyrate |
| sodium cyclopentadiene | sodium diphenylide |
| sodium formate | sodium diethylaluminum dehydride |
| sodium methylate | sodium acetylide |
| lithium aluminum tetrahexyl | lithium phenyl acetylide |
| lithium butoxide | lithium phenoxide |
| lithium butyl | lithium formate |
| lithium allyl | lithium dephenyl phosphide |
| lithium aluminum tri-tertary butoxy hydride | lithium dimethylamide |
| sodium dihydrobis (2- | cyclopentadenyl lithium |

TABLE I-continued
ORGANIC REDUCING, DEHALOGENATION, OR DEHYDROGALOGENATION MATERIALS

| | |
|---|---|
| methoxyethoxy aluminate | (lithium cyclo-pentadienide) |
| sodium dihydrobis (2-methoxyethoxy) aluminum hydride | lithium benzoate n-butyl lithium in an organic solvent |

Type 3 synthesis of the graphitic intercalates involve salt intercalation, reduction to the metallic state, anion/reductant removal and drying as shown in the following reactions in which chromium is used as the example of the metal and the oxalate is used as the salt example:

TYPE 3 SYNTHESIS

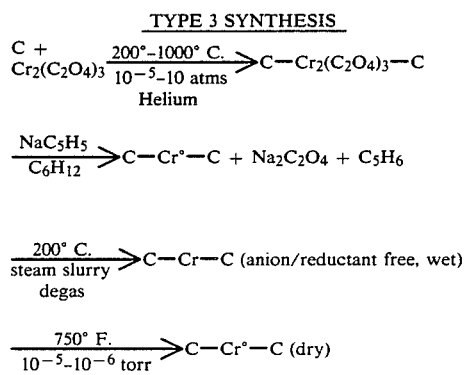

Type 4 synthesis of graphite intercalates is employed for those intercalates that can be reduced to the elemental metallic or active gettering state after salt intercalation by the action of inorganic reducing, dehalogenation or dehydrohalogenation systems. The same or similar intercalation salt precursors previously mentioned are suitable as the initial starting materials for Type 4 intercalation. The metals that are suitable for Type 4 synthesis would be yttrium, cerium nickel, chromium and chromium trioxide. Suitable reductant materials for Type 4 intercalation are as listed in Table 2.

TABLE 2
INORGANIC REDUCING, DEHALOGENATION, OR DEHYDROGALOGENTATION MATERIALS

| | |
|---|---|
| sodium borohydride | sodium borodueteride |
| lithium aluminum hydride | sodium amide |
| sodium cyanide | lithium amide |
| sodium hydride | lithium nitride |
| sodium silicate | lithium hydride |
| sodium cyanoborohydride | lithium deuteride |
| sodium cyanate | lithium metal dispersion |
| sodium azide | lithium borohydride |
| sodium metal dispersion | titanium (III) chloride-lithium tetrahydrido-aluminate 4:1 mixture |

A typical Type 4 synthesis using cerium and the chloride as examples is as follows:

TYPE 4 SYNTHESIS

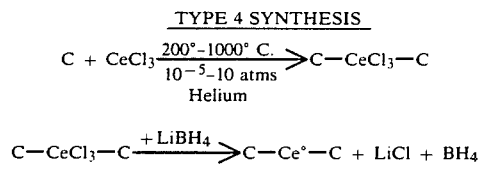

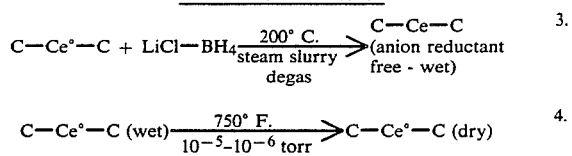

The fifth type of synthesis involves a reduction to the elemental metallic or active gettering state after salt intercation by thermodecomposition in inert environments. Typical intercalate precursors that can be decomposed to the elemental state after salt intercalation are listed in Table 3:

TABLE 3
DECOMPOSITION INTERCALATE PRECURSORS

| | |
|---|---|
| nickel carbonate | chromium carbonyl |
| nickel carbonyl | cerium carbonate |
| nickel formate | cerium carbide |
| nickel cyanide | chromium oxalate |
| nickel oxalate | chromium oxychloride |
| cerium oxalate | yttrium oxalate |

Typical Type 5 synthesis involves salt intercalation, thermo decomposition and by-product removal. It should be noted that the salt intercalation step must be carried out at a temperature less than the normal decomposition temperature. Typical Type 5 synthesis reaction using nickel carbonyl are as follows:

TYPE 5 SYNTHESIS

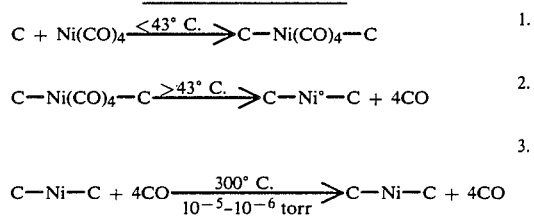

Type 6 intercalation involves physical vaporization of elemental metal into the graphite interlamellar structure and/or at the surface or in the porosity of graphite. The metal may be incorporate by other techniques such as vacuum sputtering, vacuum metalization processes, ion implantation, ion sputtering, or similar high temperature vacuum or inert gas metal vapor techniques.

Table 4 lists the metal precursors that may be incorporated by this technique.

TABLE 4

| | |
|---|---|
| cerium | ceric oxide |
| cerous oxide | chromium |
| chromium oxide | nickel |
| yttrium | Inconnel |
| Nichrome | yttrium-nickel |
| yttrium-nickel-chromium oxide | yttrium-chromium-chromium oxide |
| yttrium-nickel-spinel (MgAl$_2$O$_4$) | |

Typical Type 6 intercalation processes employing an electron beam or sputtergun technique are as follows:

TYPE 6 SYNTHESIS

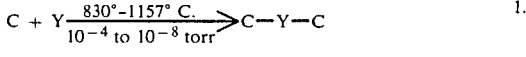

-continued
TYPE 6 SYNTHESIS

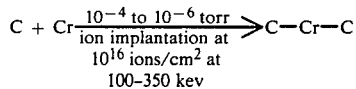   2.

Type 7 intercalation involves formation directly from a metal salt that will decompose and interlamerllaly combine with graphite platens to form a metal graphite intercalate. The typical precursors for this type of intercalation are nickel carbonyl, chromium carbonyl, biscyclopentadienyl nickel, biscyclopentatienyl chromium and biscyclopentatienyl yttrium dichloride. A typical Type 7 intercalate synthesis using nickel carbonyl as the example is as follows:

TYPE 7 SYNTHESIS

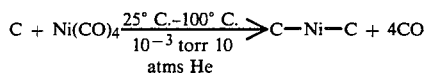   1.

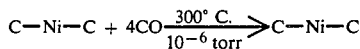   2.

The last type of graphite intercalate synthesis that will be described herein involves using organometallic or organometallic mixtures as intercalate precursors that can be reduced to the elemental metal state by organic or inorganic reduction or by decomposition. Typical organometallic intercalate precursors that can be used for this type synthesis are listed in Table 5.

TABLE 5
ORGANOMETALLIC GRAPHITE INTERCALATE PRECURSORS

| | |
|---|---|
| dicyclopentadienyl nickel | dicyclopentadienyl chromium |
| dicyclopentadienyl nickel carbonyl dimer | nickel acetylacetonate |
| tris(cyclopentadienyl) trinickel dicarbonyl | anisolechromium tricarbonyl |
| benzenechromium tricarbonyl | nickel nitrosyl tricarbonyl |
| chromium trinitrosyl tricarbonyl | cerous acetylacetonate |
| dicyclopentadienyl ytrrium dichloride | dicyclopentadiene nickel |
| dimethylanilinechromium dicarbonyl | toluenechromium tricarbonyl |
| yttrium acetate | yttrium hexaantipyrine perchlorate |
| yttrium hexaantipyrine perchlorate | yttrium hexaantipyrine triodide |
| triscyclopentadienyl yttrium | hexaureachromium peryttrate |
| disquotetraamine nickel nitrate | |

The typical Type 8 synthesis involves precursor intercalation, reduction to the metallic state, and then byproduct removal which may also involve drying and/or off gasing. An example of this Type 8 synthesis using dicyclopentadienl nickel is as follows:

TYPE 8 SYNTHESIS

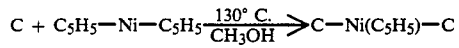   1.

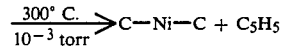   2.

-continued
TYPE 8 SYNTHESIS

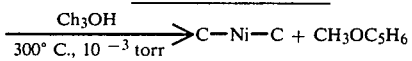   3.

Intercalated boron nitride systems are defined as those systems containing metal atoms or mixture of metal atoms interlamellarly intersteally chemically bound to non-turbostratic boron nitride. Since boron nitride has the same structure as graphite, boron nitride can form intercalation compounds from donor molecules by forming $sp^3$ bonds with the boron atoms or by bonding by utilizing the electron pairs of the nitrogen atoms in the boron nitride molecule. A third type of intercalated boron nitride system is formed by physical techniques such as salt intercalation/decomposition, vaporization/sputtering or sublimation/decomposition. The boron nitride intercalates which are formed by $sp^3$ bonding of boron exceptors can be synthesized from chromium chloride, cerium chloride, nickel chloride and cobalt chloride. A typical synthesis reaction using chromium chloride as the example is as follows:

TYPE 1 BN INTERCALATE SYNTHESIS

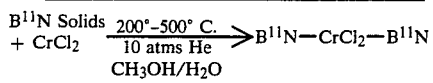   1.

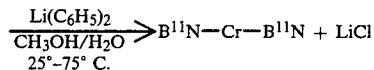   2.

   3.

   4.

The second type of boron nitride intercalate synthesis involves the reaction of a metal salt and the electron pairs on the nitrogen atom in the boron nitride molecule. Yttrium salts are intercalated with boron nitrde at approximately the 13 percent weight level and reduced to the active metal state using various reduction systems. The ytrrium salt precursors are defined as yttrium chloride and/or yttrium nitrate. The following is an example of this type of synthesis with yttrium chloride:

TYPE 2 BN INTERCALATE SYNTHESIS

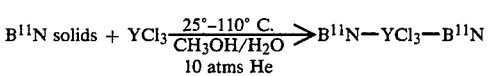   1.

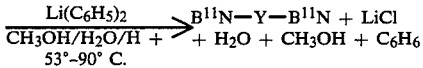   2.

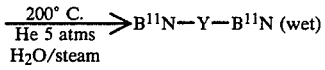   3.

   4.

The precursors for the boron nitride intercalates that are formed by physical methods such as salt intercalation/decomposition are as listed in Table 6 and 7 together with the decomposition temperature, their sublimation temperature or the metal vaporization sputtering temperature and pressure.

TABLE 6
BORON NITRIDE INTERCALATES PRECURSORS FOR DECOMPOSITION AND SUBLIMATION

| PRECURSOR | DECOMPOSITION °C. | SUBLIMATION °C. |
|---|---|---|
| Ni(CO)$_4$ | <40° | >43° |
| Cr(CO)$_6$ | <110° | >110°-140° |
| (C$_5$H$_5$)$_2$ Ni | <130° | >130° |
| (C$_5$H$_5$)$_2$ Cr | <170° | >72° |
| | <68° (10$^{-3}$ torr) | >(10$^{-3}$(torr) |
| (C$_5$H$_5$)$_3$ Y | <35° | >38° |
| (CH$_3$C$_5$H$_4$)$_2$ Ni | <36° | >40° |
| (C$_5$H$_5$)$_2$ Cr —C$_5$H$_5$Cr(CO$_3$) | <180° | >195° |
| (C$_5$H$_6$)$_2$Ni | 40° | 45° |
| (C$_5$H$_5$NiCO)$_2$ | 130° | 136° |
| (C$_5$H$_5$)$_2$ YBr$_2$ | 200° | 225° |

TABLE 7
BORON NITRIDE INTERCALATE PRECURSORS FOR METAL VAPORIZATION SPUTTERING

| PRECURSOR | METAL VAPORIZATION SPUTTERING °C./P IN TORR |
|---|---|
| Cerium (Ce) | 970°-1380° at 10$^{-8}$ to 10$^{-4}$ (electron beam) |
| Ce$_2$O$_3$ Ceric oxide | 1890°-2310° at 10$^{-8}$ to 10$^{-4}$ (electron beam) |
| Cr | 837°-1157° at 10$^{-8}$ to 10$^{-4}$ (electron beam) |
| Cr$_2$O$_3$ | 2000° at 10$^{-4}$ (electron beam) |
| Ni | 925-1262° at 10$^{-8}$ to 10$^{-4}$ (electron beam) |
| Y | 830°-1157° at 10$^{-8}$ to 10$^{-4}$ (electron beam) |
| Nichrome (NiCr) | 847°-1217° at 10$^{-8}$ to 10$^{-4}$ (electron beam) |
| Y/Ni | 900°-1300° at 10$^{-8}$ to 10$^{-4}$ |

A typical salt intercalation/decomposition synthesis is as follows:

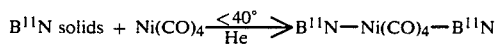

1.

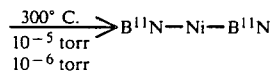

2.

A typical vaporization/sputtering synthesis is as follows:

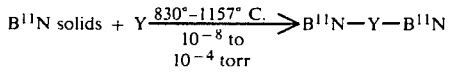

A typical sublimation/decomposition synthesis is as follows:

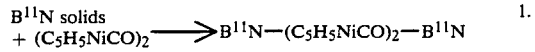

1.

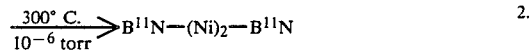

2.

Gettering agents or mixtures of gettering agents can be compounded into the getter-lubricant matrices in the form of finely divided powders, if the active metal powder is pretreated in an appropriate manner. The pretreatment consists of a coating on the surface of the metal powder getter to deactivate the powder from reacting with water and oxygen at room temperature. The coating pretreatment also creats an affinity between the coated particle and the lubricant dispersion. Metal powders which are to be used as gettering agents must be capable of reacting with hydrogen or iodine at elevated temperatures in the presence of other fission products. Various oxides of certain metals, such as CrO$_x$ can also be compounded to react with cesium, rubidium and tellurium. The preferred metal powders for nuclear applications would be those systems that will not alloy with the fuel cladding or otherwise predispose the fuel clad to corrosive action or further attack by fission products.

Examples of the modified metal powders or oxide powders which can be employed are yttrium, chromium and CrO$_x$ such as CrO$_2$, Cr$_2$O$_3$ and CrO$_3$. In each case, the metal or metal oxide powder would be pretreated such that a coating of graphite adheres to the surface of the particles. This is preferably accomplished by first degreasing the metal or metal oxide powder in a suitable conventional manner in a non-oxidizing degreasing agent using an inert dry box. The metal or metal oxide powders should be $-325$ to $+400$ mesh in size. Minus 400 mesh can be tolerated if it does not increase the risk of pyrphoricity. The powder is then dispersed in a concentrated colloidal dispersion of pure electric-furnace graphite in isopropanol. This mixture is then tumbled during which the isopropanol evaporates leaving a coating of graphite on the surface of the particles. After tumbling, the coated particles can be seived or ground to yield a free flowing powder.

Lubricating Components

An effective lubricating system for the cladding-pellet interface that will be exposed to nuclear service must have particular characteristics. First of all, the lubricant must exhibit lubricating properties so it can function as an efficient lubricant under reactor temperature and irradiation conditions. The lubricant must also have sufficient film strength to withstand and ultimately redistribute the pelet-clad stresses generated during service. There must also be sufficient adhesion to the cladding substrate so as to maintain the lubricant film integrity and the post-cure purity of the lubricant must be such as to prevent corrosive attack of the clad substrate.

The lubricants for use in the present invention include graphite and boron nitride either alone or in combination with each other or with either one or both of them mixed with phenol or methyl phenyl siloxane, polyphenyl ethers having five or six member ring systems, and/or carborane polysiloxanes.

The graphite for use in the present invention may be synthetic, recrystalized, petroleum coat base, anthracite coal base, carbon-graphite, highly ordered pyrolytic graphite, and fibrous roved/reinforced graphite, all of general purpose or premium grades having electronegative, non-turbostratic characteristics. The boron nitride is, as a practical matter, enriched in $B^{11}$ and depleted in $B^{10}$ and is nonturbostratic hexagonal. As indicated, mixtures of graphite and boron nitride may be used. The carborane polysiloxanes are also, as a practical matter, enriched in $B^{11}$ and depleted in $B^{10}$ and may be either methyl, methyl phenyl, or methyl-1-cyanoethyl or mixtures thereof.

The film strength of the coating is a function of various parameters including the particular binder system employed, the condition of the substrate surface, the purity of the ingredients and the particular curing techniques that are employed. Although extremely high film strengths under yield conditions can be obtained by using various binders, some binders can reduce the efficiency of the coating somewhat at high temperatures. Therefore, in some cases, it may be preferred to use unbindered systems.

The film strength of unbindered coatings can be improved by using lubricating solids having various particle sizes. Based on geometric considerations, three lubricant solids particle sizes having three discreet particle diameters will cure into a film with greatly improved film strength over that which would be obtained by using a single particle size or particle size range. More specifically, the lubricating solid should have particle sizes ranging from 0.01 to 22 microns with 50 to 65% being of the largest spherical or platen diameter, 10 to 25% being of medium diameter, and 25% being of the smallest diameter. The lubricating solids are dispersed in a vehicle such as essentially pure cyclohexane, pentane, hexane, isopropanol, p-dioxane or acetone and then cured as will be described hereinafter. Emulsifying agents may also be used to maintain the suspension of the lubricant particles in the vehicle.

As indicated, the film strength of the lubricant coatings can be greatly increased by the use of binder systems. Silicates, alumina, aluminates, aluminsolicates, zirconates, or alkaline earth silicates at levels between 5% and 15% of the weight of the lubricant particles can be used as binders. Other binders such as crosslinkable, thermosetting polymeric materials such as carborane polysiloxanes ($B^{11}$-enriched) or other similar non-halogenated thermosetting resins can also be used as lubricant binding systems. In general, binders that cure by thermal-oxidative and/or solvent release mechanisms can be employed in the lubricant system. All polymeric materials will decompose to carbon glasses during the cure cycle described later.

Adhesion of the lubricant coatings to the metallic substrates is dependent on the surface area of the substrate and the cleanliness of the bonding surface. For this reason, all substrates to be coated should be grit blasted to a surface conditon of between 20 to 80 inches RMS. After the surfaces have been grit blasted, they are washed with a solvent to remove surface debris or surface films.

Vehicle

A vehicle is defined as a media or carrier for the dispersion of both the gettering agent and the lubricating solids. In the case of an unbindered lubricating system, the vehicle is a solvent of appreciable vapor pressure that is capable of releasing from the getter-lubricant solid system leaving a fine network of gettering agent dispersed intimately in the lubricant solids matrix. Examples of such vehicles are isopropanol, cyclohexane, acetone, p-dioxane/m-dioxane, hexane, heptane and pentane, dioxolane, glucol ethers and other ethers.

In the case of a bindered lubricating system, the vehicle is actually a matrix that is used to encapsulate or entrain the lubricant network which contains the gettering agent. A vehicle in a bindered system is normally permanent and, in some cases, is capable of catalytic or thermal cross linking. Such permanent vehicles may also be chemically reactive to react with certain fissioned products and, in such cases, would be designated as a gettering vehicle. An example of such a gettering vehicle is $CaO\ SiO_3$ glasses or similar silicateous materials. The alkaline earth silicates, for example, can react with Cs and Te fission products.

The specific gravity of a ehicle system, whether it is temporary or permanent, plays an important role in the stability of the lubricant-getter emulsion. Specific gravity and viscosity, in most cases, can not be separated from each other. As a guideline, the specific gravity of the vehicle should be greater than that of the lubricant or gettering solid, assuming physiochemical phenomena are not being utilized to afford compatibility. In most cases, a suitable vehicle should have a specific gravity of twice that of the apparent bulk density of both the getter and lubricant solids and at least equivalent to that of the apparent film density of the getter-lubricant solids after cure. As the specific gravity of the vehicle approaches the apparent bulk density of the solids, the viscosity of the vehicle should be sufficiently high enough to eliminate precipitation of getter-lubricant solids during the shelf life of the material. If the vehicle density is equivalent to the apparent bulk density of the solids, the viscosity of the vehicle should be no less than 300 centipoise.

In some cases the specific gravity and viscosity of a lubricant vehicle cannot be matched to the getter-lubricant solids physical properties as previously described. However, because of the physiochemical differences between the vehicle and the solids, the solids may remain stable in the getter-lubricant emulsion. The rules of stability established for getter versus lubricant solids discussed hereinafter also is true for getter-lubricant dispersions in vehicles. For example, the greater the differential in polarity or ionic activity of the getter-lubricant system relative to the vehicle polarity, the greater the suspension stability of the solids in the solvent media.

Compatibility of Getter and Lubricant

One important factor controlling the suitability of a getter-lubricant system is the compatibility of the getter in the lubricant matrix. Compatibility involves a number of factors. The first factor to be considered is the stability of the suspension of the getter in the lubricant matrix. A second factor to be considered is the oxidation stability of the getter in the lubricant matrix during the development of the film and after curing. Other factors to be considered are the film forming characteristics of the mixture of the getter and lubricant and the effects of the gettering material on the lubricating characteristics.

The compounding of the gettering agents into the lubricating matrix should not significantly interfere with stability of the solvent-lubricant or binder-lubricant systems. Stability is defined as the ability of the lubricant-getter system to maintain reasonable emulsion or suspension integrity after compounding. The physical properties that control emulsion stability and, ultimately, the getter-lubricant matrix compatibility involve particle size and particle size distribution, apparent density characteristics and particle geometry and the particle size of the graphite or other lubricant solids. In most cases, the particle size of the getter system should be slightly less than that of the lubricant and in no case should it exceed 125% of that of the lubricant solid. If an innocuous emulsifying agent is used in the lubricant system and the emulsifying agent is degraded from the system with the vehicle used to form a stable film or network, the apparent agglomerate film size (multiple particle size) can be much larger than the lubricant solids particle size. In this case, the particle size of the getter agent can be larger than the lubricant solids particle size but should be slightly less than the network platen size. For the purposes of forming the most stable film structure, the particle sizes of both getter and lubricant should be within the range of 0.1 to 20 microns. Particle size distribution of the gettering agents compounded into the lubricant matrix should conform as closely as possible to the particle distribution of the lubricant solids before film formation to maintain optimum film compatibility. As an example, the particle size distribution should be such that the largest size particles comprise 50 to 66% of the mix by volume, the medium size particles comprise 25 to 10 volume percent and the smallest size particles comprise about 25 volume percent.

The particle geometries of the gettering agents will be a function of the form of the getter being compounded into the lubricant matrix. Intercalated getter systems (graphite getters) will have a platen geometry similar to the platen geometry of the graphite or $B^{11}N$ lubricating matrix.

Another factor affecting the stability of the getter-lubricant system is the apparent density characteristic existing between the lubricant and the getter. In order for the gettring system to be stable and compatible in the lubricant matrix, consideration must be given to the apparent bulk density of the getter and lubricant solids, the apparent solution density of the lubricating system versus the lubricating-getter system and the composite density characteristics. The apparent bulk density of powdered solid materials will deviate from the theoretical density of the generic material based on the particle size of the powder. In order to maintain a stable lubricating emulsion or suspension, the apparent bulk density of the gettering agent should not exceed the apparent bulk density of the lubricating solids. In the case where stability of the emulsion can be enhanced by physiochemical phenomena such as polarity differences and/or chemisorption phenomena, the apparent bulk density of the getter materials can exceed the apparent bulk density of the lubricating solids by no greater than 20 to 30%.

The apparent solution density of a getter-lubricant composite system can exceed the combined solution density of the lubricant-vehicle system by no greater than 20 to 35%. The solution emulsion or suspension stability can be altered beyond these values by taking advantage of polarity attractions or chemisorption between the getter and lubricant solids or the getter and the lubricant vehicle. While the apparent film density does not technically affect the emulsion or suspension stability, any gross change in apparent film densities because of getter addition can alter the adhesion and film strength of the final getter-lubricant system. The addition of the gettering agents to the lubricant-vehicle matrix should not increase the apparent film density of the final cured film system by greater than 10 to 55%. Anything over 55% may be compensated by the addition of adhesion agents, cross linking or curative agents or by changing the physiochemical characteristics of binders such as precured viscosity of polar/nonpolar attraction.

Concentration of Gettering Agent in Lubricant System

The concentration of gettering agents in the lubricant matrix will affect both the emulsion stability and film integrity. Without affecting the lubricating and film properties, the concentration of gettering agents in the lubricant/vehicle system can range from 50% to 10% depending on the chemical composition and physical properties of the gettering system. If the gettering system is a graphitic type, for example, an interlamellar yttrium compound (intercalate) containing 25% active yttrium metal, the gettering agent can be easily compounded into a solvent vehicle unbindered graphite or boron nitride system. If the getter can be compounded into a solvent release film forming lubricant (unbindered) and maintain adequate stability, the same getter can be compounded into a bindered, cross linkable lubricant matrix. However, the reverse is not necessarily true. In some instances, pretreatment of the getter with a graphite mixture of lubricant solids in a lubricant vehicle will render the getter system stable in an unbindered lubricant emulsion. Most powdered metal gettering systems must be pretreated in this manner before addition to an unbindered lubricant matrix. If the powdered metal is vacuum metalized or sputtered onto lubricant solids and then compounded in a lubricant vehicle matrix, the getter-lubricant system will have sufficient emulsion stability. Most powdered metals can be easily compounded into bindered systems primarily because of the increase in matrix viscosity. The concentration of gettering agents is ultimately determined by the effective concentration of fission byproducts and pellet impurities which are expected in any particular situation.

The concentration of lubricant solids in the getter-lubricant vehicle system will also control emulsion or film stability. The optimum film thickness that will produce acceptable film lubication is 0.15 to 0.98 mils. A normal unbindered lubricant system having between 10 and 18% lubricant solids will cure to a film in this thickness range and have sufficiently adequate emulsion stability. Most unbindered lubricant systems will remain stable up to solids levels of about 35%.

Based on overall considerations, the getter and lubricant content in the vehicle should not exceed 10 to 18% with the lubricant solids concentration being a minimum of 5 to 9% in an unbindered system. The concentration of lubricant solids content in a bindered or grease-like system (i.e., polycarborane siloxane matrix) must be adjusted upward to minimize bindered effects on film lubrication. In most cases, the concentration levels are between 25 and 55% depending on the lubricant type. Emulsion stability of bindered systems is not normally a problem because of increased inherent viscosity of the binder vehicle in a bindered system.

Oxidation Stability of Gettering Agent in Lubricant Film

The oxidation stability of the gettering agent in the cured lubricant film is important since it will affect the ease of handling the coating without special handling precautions (such as might be caused by pyrophoricity) and the effectiveness of the getter to react with the fission gases and pellet impurities. The intercalated-metal systems disclosed herein as both hydrogen/hydrogen-bearing and iodine getters are interlamellar graphite species where the active metals are arranged between the graphite platens. By utilizing submicron to micron mixtures of various graphites mixed with the intercalated graphite/metal system, the chance of oxidizing the active metal is greatly reduced. The minute graphite particles insulate the active metal from rapid oxidation sufficiently to allow its handling as a thin film. Therefore, intercalated metals such as yttrium, nickel, chromium and cerium will show minimal oxidation or loss of gettering effectiveness during film forming or during ancillary handling such as fuel loading.

Finely divided powdered metals are pyrophoric or pyrotechnic. Reaction with oxygen depending on the moisture content is often explosive and extremely rapid. In order to use finely divided micron or submicron powdered metals as getters, and material must be rendered unreactive to oxygen without effecting its gettering properties. This can be done, for example, by slurring the finely divided metal powders in a submicron electrocoating solution of graphite in a helium environment. The graphite dispersion forms a fine homogeneous network of graphite platens that are relatively impervious to oxygen. The sumicron coated particles are then recoated with a graphite solids containing lubricating dispersion such as 10.71% colloidal dispersion of pure electric furnace graphite in isopropanol. The system is then allowed to cure to a dry film at ambient conditions. When removed from the helium environment and exposed to ambient air of about 50% relative humidity, the coated powder will not react prrophorically with the ambient oxygen.

Getter Concentration

The concentration of gettering agents in the getter-lubricant system, aside from being controlled by lubricant-matrix consideration, is dependent on the efficiency of the particular getters being used. Gettering efficiency is a function of various parameters, including competitive reaction situation that may be present in the gettering environment. For example, oxygen may compete for the getter in preference to the particular species to be gettered.

Based on analytical data, the greatest amount of water that could be expected to be present in fuel is about 7.5 ppm. Assuming 2,500 grams of $UO_2$ in a fuel rod, this would amount of 18,742 micrograms of water or 2,082 micrograms of hydrogen. If water is present, it will decompose under operating conditions to oxygen and hydrogen. The oxygen will compete with the hydrogen for reactive getter sites. With this amount of water, and assuming a yttrium getter, it can be calculated that the amount of yttrium necessary to getter the hydrogen will be 0.0616 grams and the amount of yttrium required to getter the oxygen will be 0.0307 grams. Therefore, the total amount of yttrium to getter both the oxygen and hydrogen will be 0.0923 grams. These values are calculated from the following reactions:

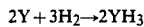

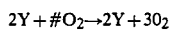

Similar calculations can be readily made for all of the competing reactions which might take place with respect to each of the getters which are used and each of the gettered materials in the system. These calculations will give the specific getter concentration needed to getter the fission by-products and pellet impurities. However, it will normally be desired to include greater quantities of the getter materials so as to provide excess gettering ability so long as such a large concentration of the getters is not used which would cause instability in the lubricant matrix.

Getter Lubricant Formulations

Getter-lubricant systems can be formulated for simple or multiple gettering purposes and they can be coated on the inside diameter of the cladding material or on the outside diameter of the fuel or poison pellets. As previously indicated, the getter-lubricant formulations may be either a single system which will getter one of the various fission products or impurities or it may be a multiple system which will getter two or more of the types of fission products and impurities. Following are examples of various types of systems.

EXAMPLE 1

Yttrium graphite intercalated powder containing 10 to 25% yttrium and with a particle size of $-325$ Tyler standard mesh to $+400$ mesh is used as a hydrogen getter. The lubricant is a 10.71% graphite solids in certified pure isopropanol as the vehicle. The solid-solvent matrix will form a dry film containing the gettering agent with a dry film thickness of 0.2 to 0.7 mils. Some commercially available dispersions of graphite in isopropanol are DAG-154 and DAG-156 from the Acheson Colloids Co. and NEOLUBE from Great Lakes Graphite Corp. As an example, the coating for the inside diameter of the fuel cladding may contain from 13.61 to 49.52% of the getter component (assuming 25% yttrium) in from 50.48 to 86.39% of the lubricant-solvent matrix based on the dry or cured film weight. A typical ratio would be 31.56% getter to 68.44% lubricant-solvent matrix. This is based on a fuel rod cladding having an inside diameter of 0.388 inches with a coating having a dry film thickness of 0.5 mils. If the coating is to be thinner or if less area is available to be coated, the percentage of getter in the getter-lubricant mixture must be greater in order to provide the same quantity of getter in the rod.

EXAMPLE 2

Another hydrogen getter is formed from a nitrogen-nickel alloy powder which is minus 325 to plus 400 mesh which is oxide and hydride free and which conforms to the necessary purity criteria. The nickel content of the alloy is dependent on the phase diagram temperature at which free nickel is not formed in the alloy which is about 10 to 20%. The same lubricant system is used as an Example 1. The coating for the inside diameter of the fuel cladding may contain from 2.63 to 14.42% of the alloy getter in the getter-lubricant-solvent system. A typical ratio would be 8.52% getter to 91.48% lubricant-solvent matrix. If the getter-lubricant is to be coated on the outside diameter of the fuel pellets, there will typically be a greater amount applied. For example, a coating on the outside diameter of the fuel pellets might contain from 26.18 to 49.67% getter in the getter-lubricant-solvent system.

EXAMPLE 3

As a getter for the halogens such as iodine, a chromium metal powder of the same particle size as set forth in Examples 1 and 2 was used. A metal powder is degreased in a suitable fashion in non-oxidizing degreasing agent using an inert dry box. The metal powder is then disbursed in the same solvent vehicle as is used for the lubricant system to wet out the surfaces of the powder. A quantity of the lubricant-solvent system is then added to the metal powder-solvent slurry. This mixture is then slowly evaporated to dryness and tumbled leaving a coating of the lubricant particles on the metal powder. The mixture can be sieved or ground to yield a free flowing powder. This pretreated metal powder containing the lubricant coating is then disbursed into the lubricant-solvent system at the desired concentration level. For example, the same lubricant-solvent system may be used as in Example 1. For cladding the inside diameter of a fuel rod, the composition would be in the range of 0.07 to 0.51% treated chromium powder with 99.49 to 99.93% lubricant system.

EXAMPLE 4

Another system for gettering iodine uses a chromium-graphite intercalates with from 10 to 25% chromium intercalated into the graphite. In this case the lubricant system is Everlube 823 disbursed in p dioxane. The composition range is from 0.45 to 3.08% getter in the getter-lubricant system with the preferred percentage being 1.86.

EXAMPLE 5

In this example the getter system is chromium intercalated into $B^{11}N$ with the lubricant system being $B^{11}N$ disbursed in acetone. This system is also for gettering the halogens.

EXAMPLE 6

A getter for the alkali species such as cesium and rubidium is formed from chromium trioxide. The chromium trioxide is intercalated into graphite and then thermally treated to convert the chromium trioxide to the $CrO_x$ state. This is actually accomplished during the curing steps described hereinafter except that it is held at 150° C. for 1 hour under vacuum after which the curing proceeds. Assuming 25% of the chromium trioxide initially present in the intercalate, a suitable coating contains from 0.11 to 6.49% getter in a lubricant system the same as described in Example 1. The same system will also getter the Group VI materials such as tellurium.

EXAMPLE 7

A typical getter-lubricant system adapted to getter all of the fission product species (hydrogen, halogens, alkales and Group VI materials) is formed from a mixture of yttrium-graphite intercalate, chromium-graphite intercalate and $CrO_x$-graphite intercalate in any one of the previously mentioned lubricant systems. A typical ratio of these three types of intercalate adapted to capture the expected ratio of these fission products would be 62 weight percent yttrium-graphite intercalate, 4 weight percent chromium-graphite intercalate and 34 weight percent $CrO_x$-graphite intercalate. The coating composition would typically contain from 16.55 to 51.45% of these combined getters in the getter-lubricant system.

Application of the Coating

The coating is applied from the bottom of the fuel rod by pressurizing the liquid with Ar, $N_2$, He or similar gases so that the liquid rises at a rate of 1 to 10 inches per minute up the rod. The rod can be coated in the vertical or horizontal position as long as a solid plug of fluid is maintained in the rod. Once the fluid reaches the top of the rod, it is held for 5-130 seconds and then slowly evacuated from the tube by forcing the fluid column in the reverse direction. The gas should be at a temperature of from 25° to 80° C. and the drain rate should be from 1 to 10 inches per minute. After drainage is complete, heated gas is allowed to gently pass through the rod at slightly above atmospheric pressure at a flow rate of 1-10 cc/minute. The gas flow, is maintained for 10-180 minutes at 25°-80° C.

Curing

The drained, dried rods containing the I.D. coating are placed horizontally into the I.D. of a 304 or 316 stainless steel tube furnace with heating elements placed on the outside of the tube furnace. The furnace is designed so that the I.D. of the tube can be evacuated to $10^{-5}$ to $10^{-6}$ torr and equipped with a liquid $N_2$ cold trapping system at each outlet to the vacuum source. The rods are inserted into a Zircaloy-4 grid with high purity $Al_2O_3$ spacers on the I.D. contact with the tube and the O.D. of the grid, so that the rods will be evenly exposed to the radiant heat in the vacuum environment.

The rods are placed horizontally in the grid contained in the vacuum tube furnace and exposed to a 72° F. temperature until a vacuum of $10^{-5}$ to $10^{-6}$ torr is attained and then held at this condition for 60-180 minutes. The assembly is then heated at 10° F./minute to 300°-650° F. while drawing a vacuum. Once at the desired temperature the unit is held isothermally until a vacuum of $10^{-5}$ to $10^{-6}$ torr is reached and then held constant at that vacuum and temperature for 60-180 minutes.

After these conditions are met, the assembly is heated at 10°-30° F./minute to 700°-850° F. while drawing a vacuum. It is then held at the desired temperature until a vacuum of $10^{-5}$ to $10^{-6}$ torr is reached. At this point the assembly is held constant at the 700°-850° F. temperature condition at $10^{-5}$ to $10^{-6}$ torr for 60-480 minutes. After the desired isothermal-vacuum condition and time is met the heat to the furnace is shut off and the unit is allowed to cool to 72°-120° F. under its own thermal inertia under $10^{-5}$ to $10^{-6}$ torr vacuum. Once at 72°-120° F. the coated and cured rods can be removed from the vacuum furnace. Throughout each step the $O_2$ content cannot exceed 0.01 to 0.1 ppm. All temperatures read are at the surface of the I.D. coating inside the fuel rod during vacuum thermal treatment. All vacuums are read at three equidistant locations down the length of the tube furnace. Cold trapping of the liquid nitrogen must be maintained at all vacuum ports from the oven.

While many variations of the present invention have been discussed and many specific examples have been described, it will be understood that these are merely illustrative rather than restrictive and that changes may be made without departing from the spirit and scope of the invention as claimed.

I claim:

1. A nuclear fuel element comprising a nuclear fuel material, a fuel cladding containing said nuclear fuel material and a coating between said nuclear fuel material and said fuel cladding which is adhered to at least one of said fuel material and said fuel cladding, said coating comprising:
- a. a lubricating matrix comprising a material selected from the group consisting of graphite and boron,
- b. a getter intercalated and chemically bound into said lubricating matrix, said getter selected from the group consisting of zirconium, yttrium, titanium, cerium, cobalt, nickel, chromium and the compounds, alloys and mixtures thereof, and
- c. a binder to form and hold said intercalated lubricating matrix in a continuous film.

2. A nuclear fuel element as recited in claim 1 wherein said getter comprises a powdered metal.

3. A nuclear fuel element as recited in claim 2 wherein said powdered metal includes a coating on the particles which prevents the powdered metal from reacting with water and oxygen when exposed to the atmosphere.

4. A nuclear fuel element as recited in claim 3 wherein said coating on the particles is graphite.

5. A nuclear fuel element as recited in claim 1, 2, 3 or 4 wherein said boron nitride is enriched in boron 11.

6. A nuclear fuel element as recited in claims 1, 2, 3 or 4 wherein said getter material comprises combined getters for hydrogen and hydrogen-bearing materials, halogens, alkalies, and Group VI atoms of the periodic table.

7. A curable film-forming mixture for producing a coating in a nuclear fuel element having gettering and lubricating properties comprising a homogenous mixture of a liquid vehicle, a lubricant matrix, a getter intercalated into said lubricating matrix, and a binder.

* * * * *